Sept. 30, 1969  C. W. NEFF ET AL  3,469,730
NESTABLE SHAPED CARGO CARRIER CONSTRUCTION
Filed Nov. 18, 1966  10 Sheets-Sheet 5

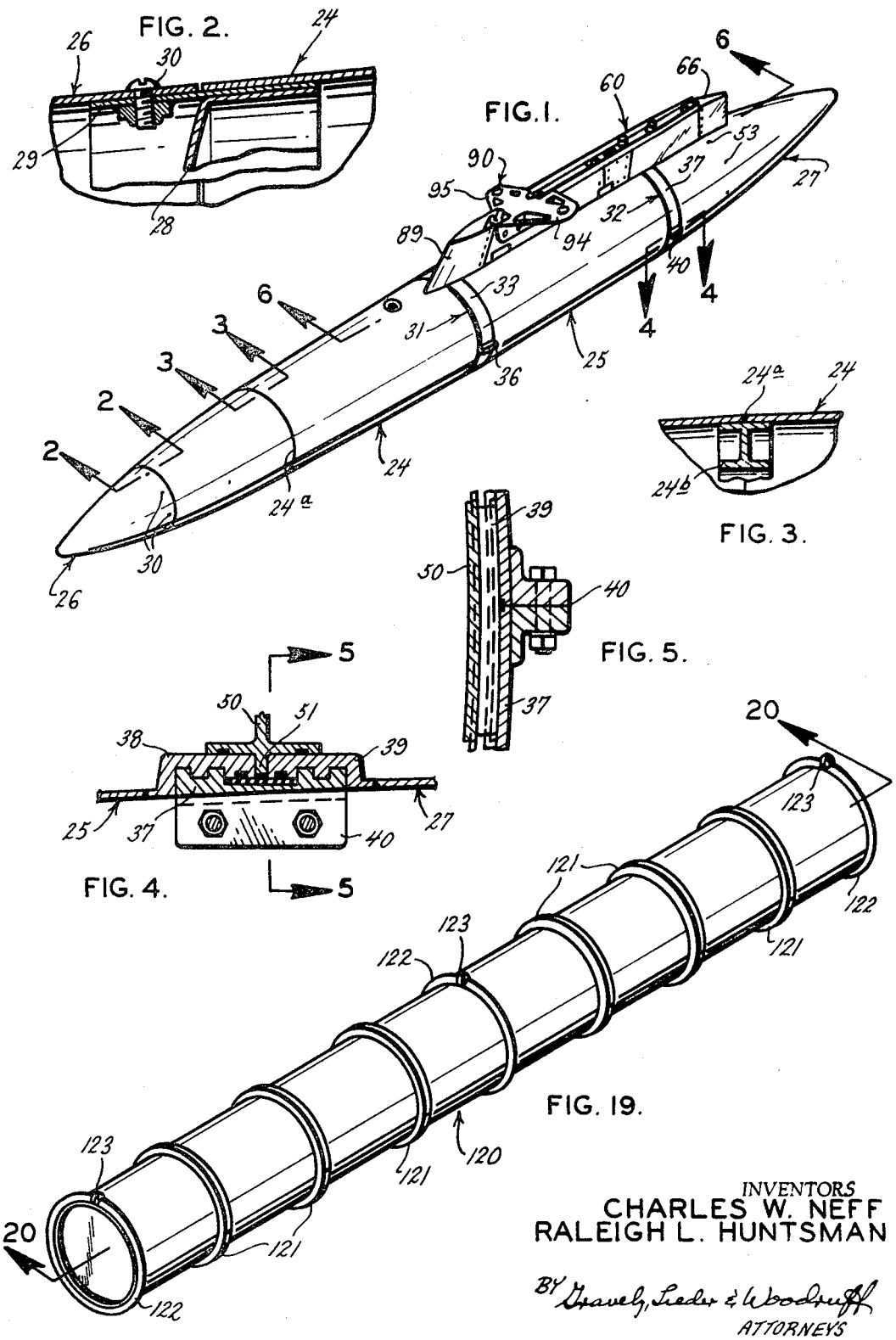

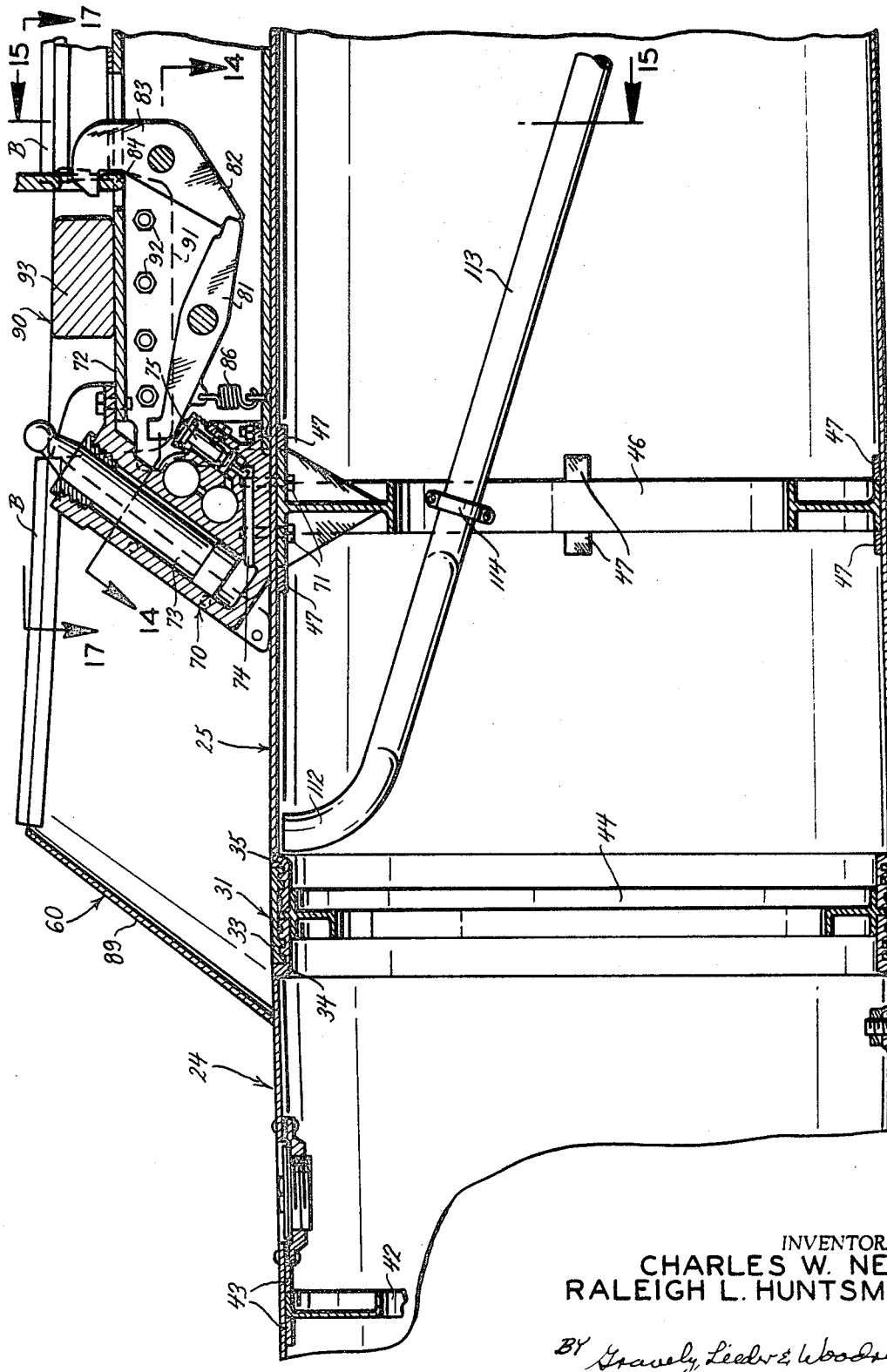

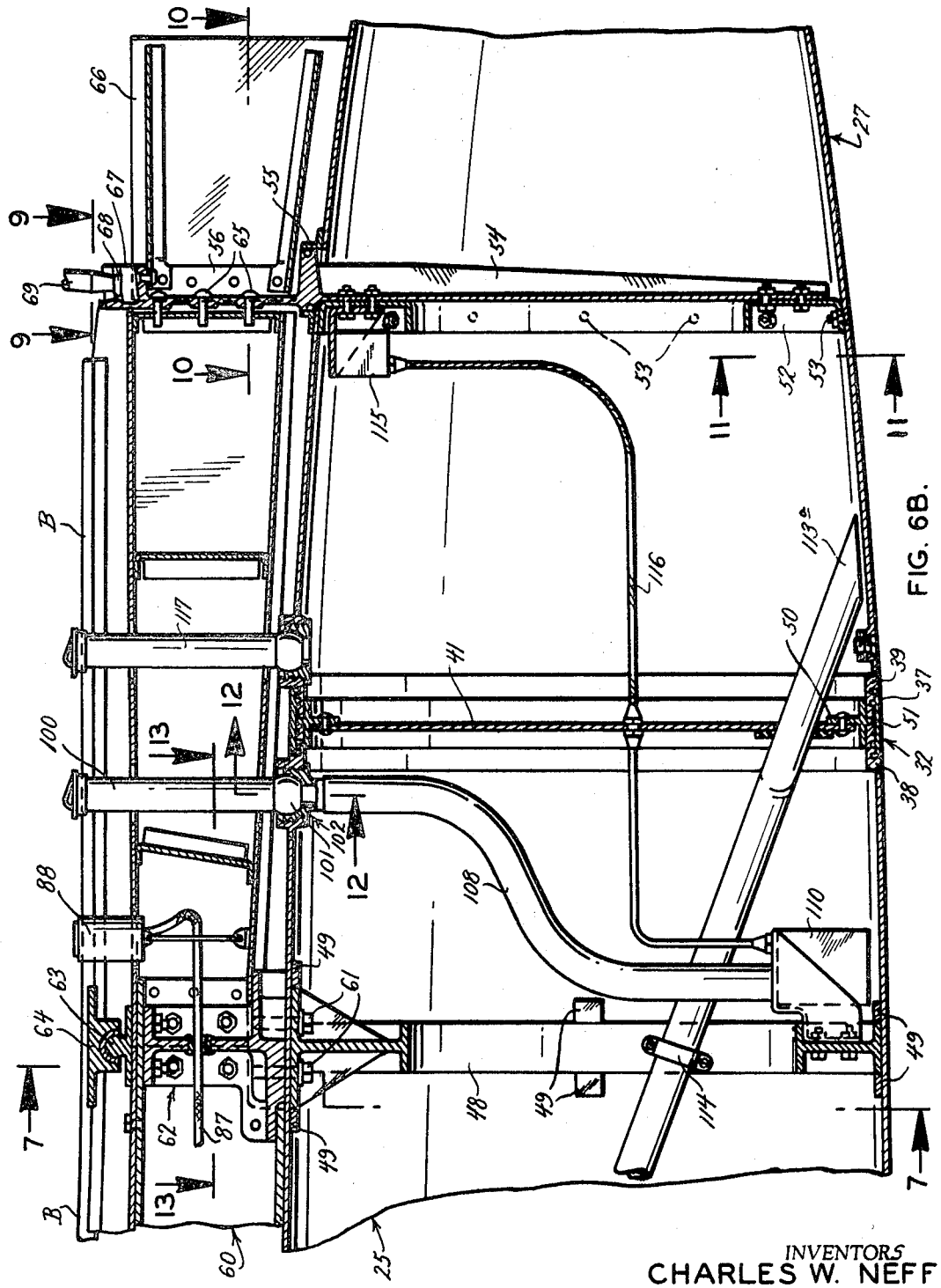

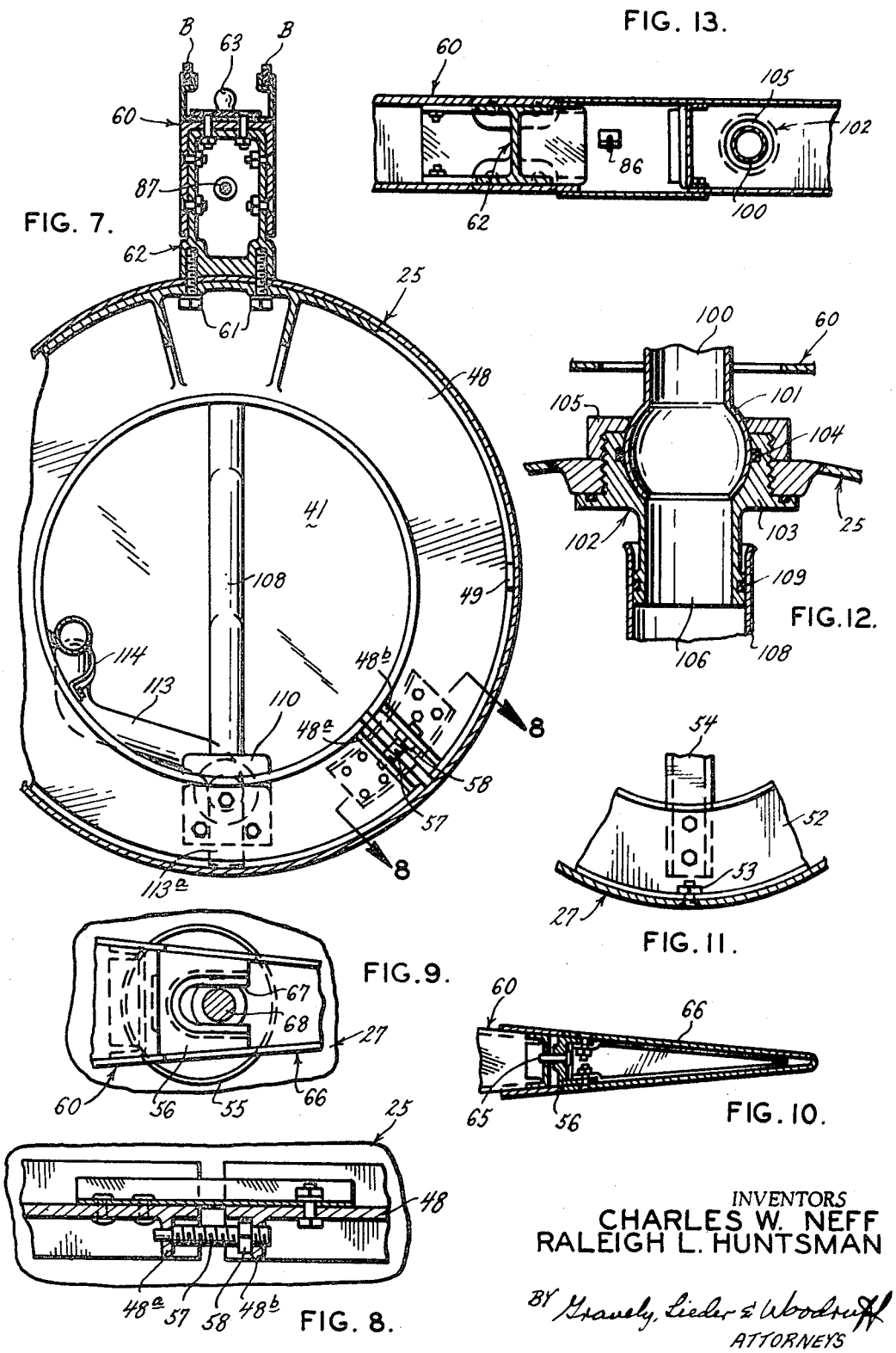

INVENTORS
CHARLES W. NEFF
RALEIGH L. HUNTSMAN
BY Gravely, Lieder & Woodruff
ATTORNEYS

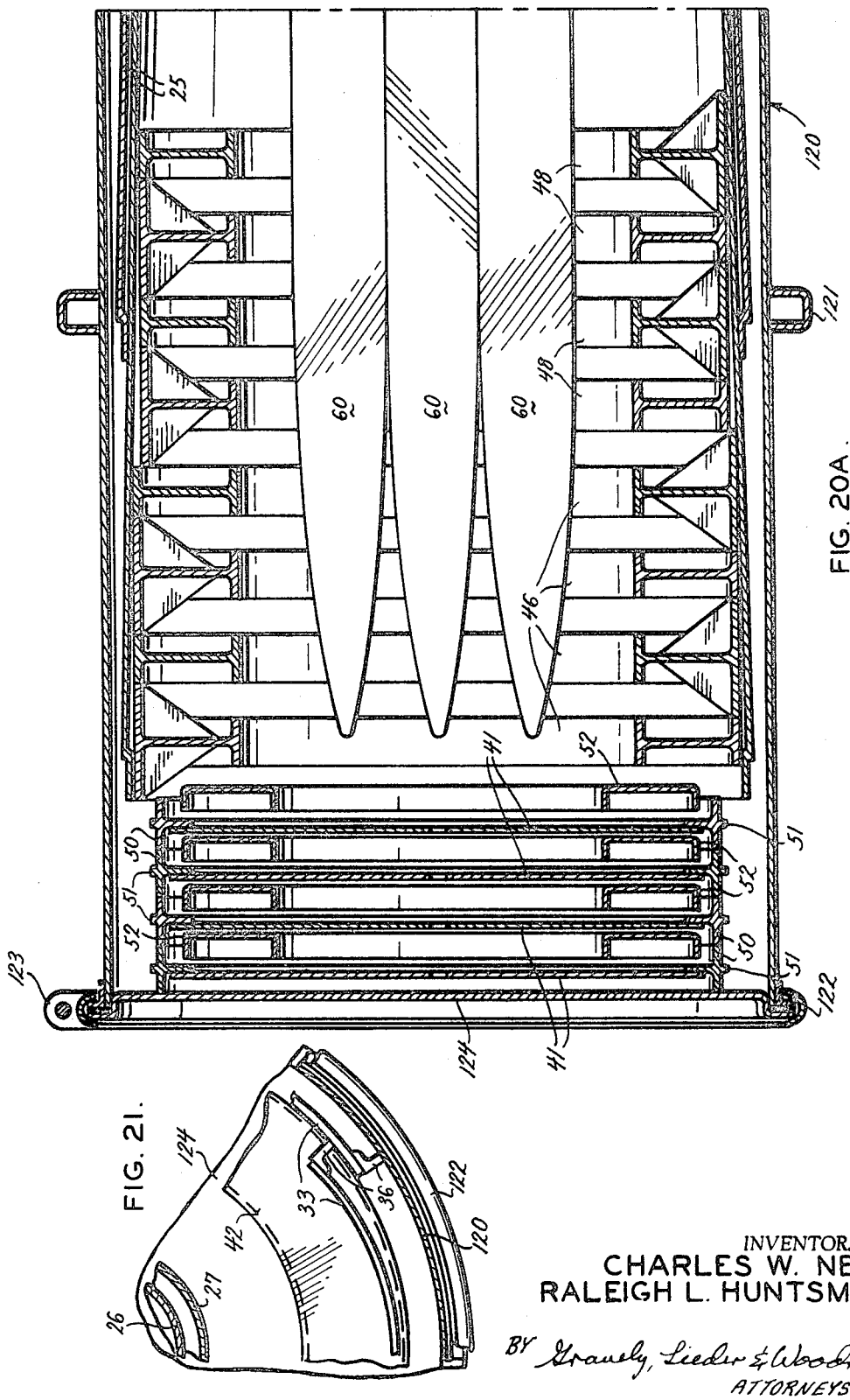

Sept. 30, 1969     C. W. NEFF ET AL     3,469,730

NESTABLE SHAPED CARGO CARRIER CONSTRUCTION

Filed Nov. 18, 1966     10 Sheets-Sheet 7

INVENTORS
CHARLES W. NEFF
RALEIGH L. HUNTSMAN

ATTORNEYS

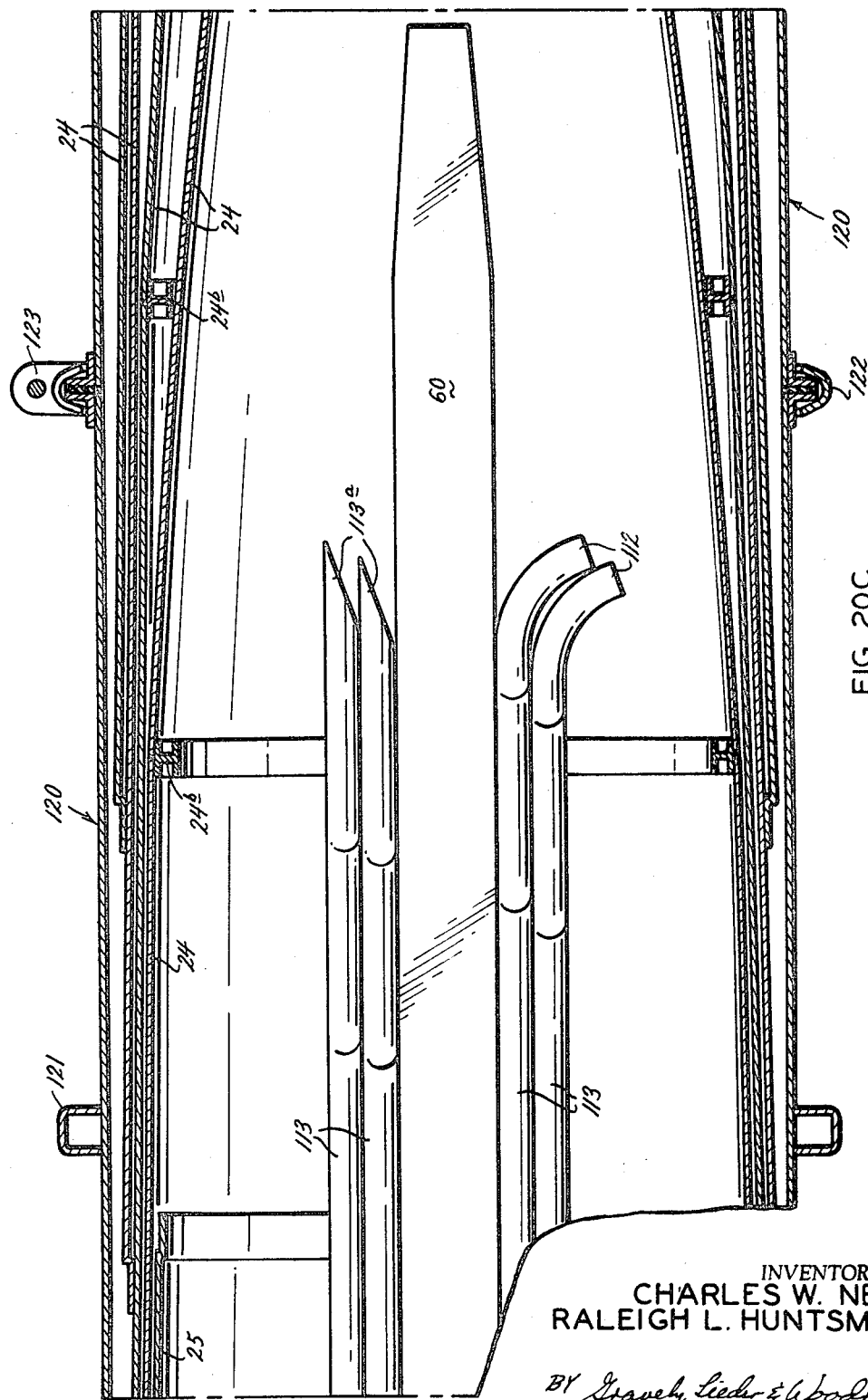

INVENTORS
CHARLES W. NEFF
RALEIGH L. HUNTSMAN

BY Gravely, Lieder & Woodruff
ATTORNEYS

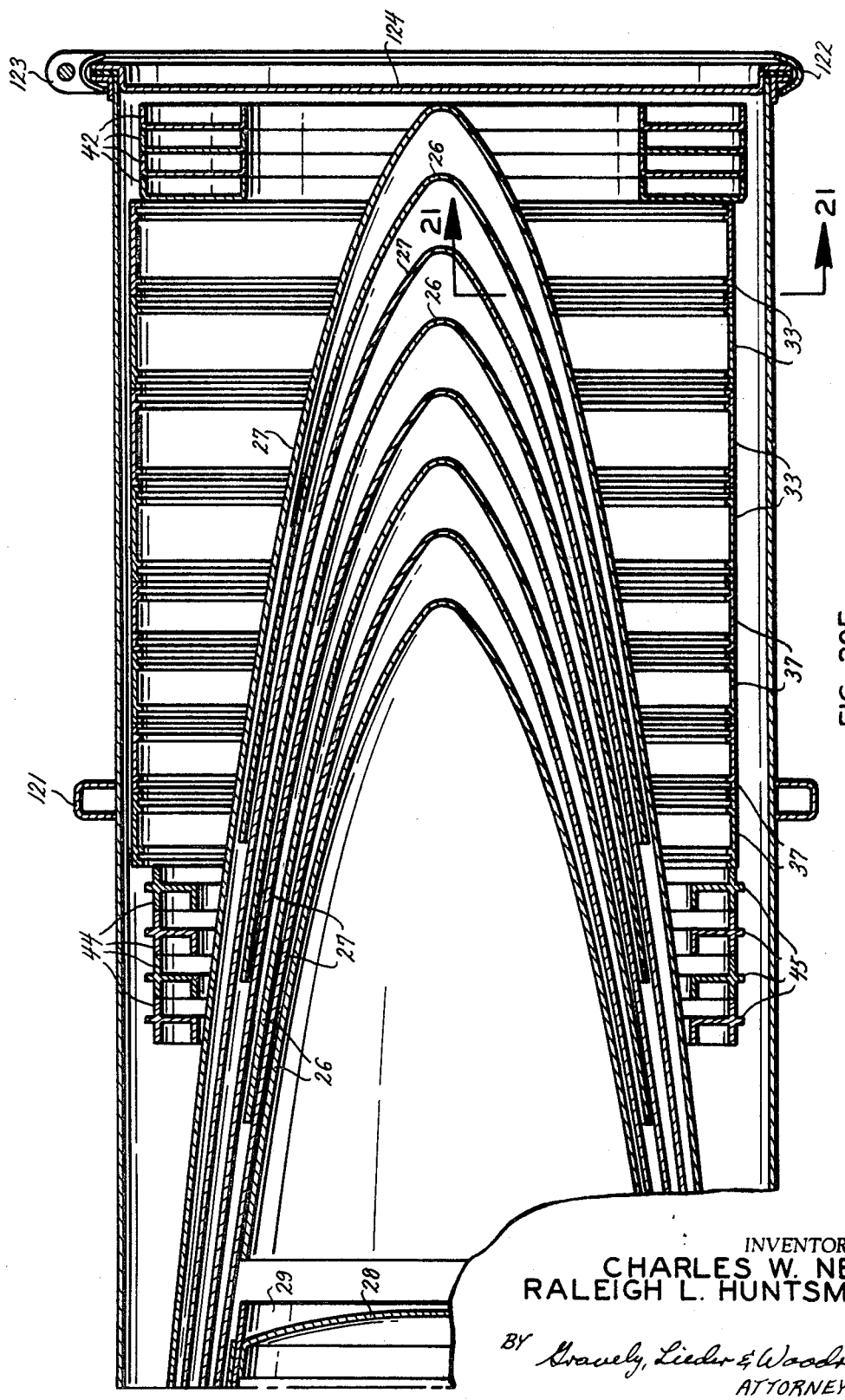

United States Patent Office 3,469,730
Patented Sept. 30, 1969

3,469,730
NESTABLE SHAPED CARGO CARRIER CONSTRUCTION
Charles W. Neff, St. Louis, Mo., and Raleigh L. Huntsman, Titusville, Fla., assignors, by mesne assignments, to McDonnell Douglas Corporation, St. Louis, Mo., a corporation of Maryland
Filed Nov. 18, 1966, Ser. No. 595,383
Int. Cl. B65d 7/04, 7/32
U.S. Cl. 220—5                                    2 Claims

ABSTRACT OF THE DISCLOSURE

A nestable shaped cargo carrier construction which includes a plurality of fixed circular sections having conically shaped configurations to permit complete nestability of the sections wherein no two sections to be joined are prevented from nesting one within the other, so that the components of a plurality of complete cargo carriers can be broken down into individual components and slidably nested into a compact package which has approximately the same circular dimension of the components but is considerably shorter in length than any individual completely erected cargo carrier.

---

This invention relates to improvement in cargo carriers for external mounting on aircraft and is particularly directed to shaped tank constructions for nested packaging. While the invention broadly relates to means for supporting a load that can be attached to an aircraft, the following description will be directed specifically to a carrier for supporting a fuel load.

Presently existing aircraft fuel tanks for external mounting and capable of being ejected are generally manufactured with central sections of cylindrical or elliptical configurations and with leading and trailing sections that streamline the central sections. These tanks are usually moved in assembled or only semidismantled conditions which utilize a considerable volume. Moreover, the internal mechanism of such existing fuel tanks is accessible only through small access doors so as not to detract from the structural integrity thereof. Trouble has been encountered also in existing types of external fuel tanks with center of gravity and flutter control, and in view of this it has been necessary to compartmentize the tanks which increases the problems and expense of manufacture, as well as reduces the rate of assembly. All together the current types of external fuel tanks have problems of excessive shipping space needs, slow assembly, chances of leaks developing, fixed components which prevent effective stacking or nesting, and when put into use they require watchfulness to guard against flutter effects. There has been little work done to improve fuel tanks so that the problems which have heretofore existed still continue.

An important object of this improved external cargo carrier is to provide a minimum number of parts or sections and to shape and size the parts for nesting so that a maximum number of complete carriers can be stored in a given space formerly necessary for one or two carriers of the existing types.

Another important object of the present invention is to provide a cargo carrier that can be separated into principal sections and to shape the sections as a frustrum of a shell so that compact nesting can be obtained.

It is still an important object of this invention to provide an external cargo carrier for aircraft that has a greatly improved arrangement of parts which simplifies manufacture thereof.

It is another important object of this invention to provide external cargo carrying tanks for aircraft that are coordinated as to structure so that the tanks can be compactly arranged or nested for greater utilization of space both in transportation and in storage facilities.

Still another object of this invention is to provide aircraft external tanks with a minimum of parts and components to obtain a faster assembly advantage in the field.

A further object of this invention is to provide a tank having a minimum number of shaped parts to greatly reduce assembly and disassembly problems, to provide greater accessibility when necessary and to reduce spare part inventory.

Another object of this invention is to provide a pressure operated, high performance, external cargo tank that when used for fuel has gravity and inflight refueling capabilities, that can be ejected, and that can be quickly disassembled and nested in multiples for logistics advantages.

These and other objects and advantages will appear in the following disclosure which relates, but without limitation as to what the cargo might be, to a preferred fuel tank construction and arrangement of parts, the same being shown in the various views of the accompanying drawings, wherein:

FIG. 1 is a perspective view from the front and top of an external fuel tank and mounting pylon which forms the basis for this disclosure;

FIGS. 2, 3 and 4 are greatly enlarged fragmentary sectional views taken at line 2—2, line 3—3, and line 4—4 respectively in FIG. 1;

FIG. 5 is a sectional view at line 5—5 in FIG. 4;

FIGS. 6A and 6B are greatly enlarged sectional views taken at line 6—6 in FIG. 1, the views being continuations of each other;

FIG. 7 is a transverse sectional elevational view taken at line 7—7 in FIG. 6B;

FIG. 8 is a fragmenary detail taken at line 8—8 in FIG. 7;

FIG. 9 is a fragmentary detail taken at line 9—9 in FIG. 6B;

FIG. 10 is a fragmentary detail taken at line 10—10 in FIG. 6B;

FIG. 11 is a fragmentary detail taken at line 11—11 in FIG. 6B;

FIG. 12 is a fragmentary detail of the fuel connector taken at line 12—12 in FIG. 6B;

FIG. 13 is a fragmentary detail taken at line 13—13 in FIG. 6B;

FIG. 19 is a fragmentary sectional view taken at line 18—18 in FIG. 17;

FIG. 19 is a perspective view of a shipping and storage container for a plurality of fuel tanks;

FIGS. 20A through 20E are continuation sectional views taken along line 20—20 in FIG. 19 to show the breakdown and storage of parts for four tanks; and FIG. 21 is a fragmentary detail view taken at line 21—21 in FIG. 20E to illustrate the packing of internal support rings.

Figure 20B:
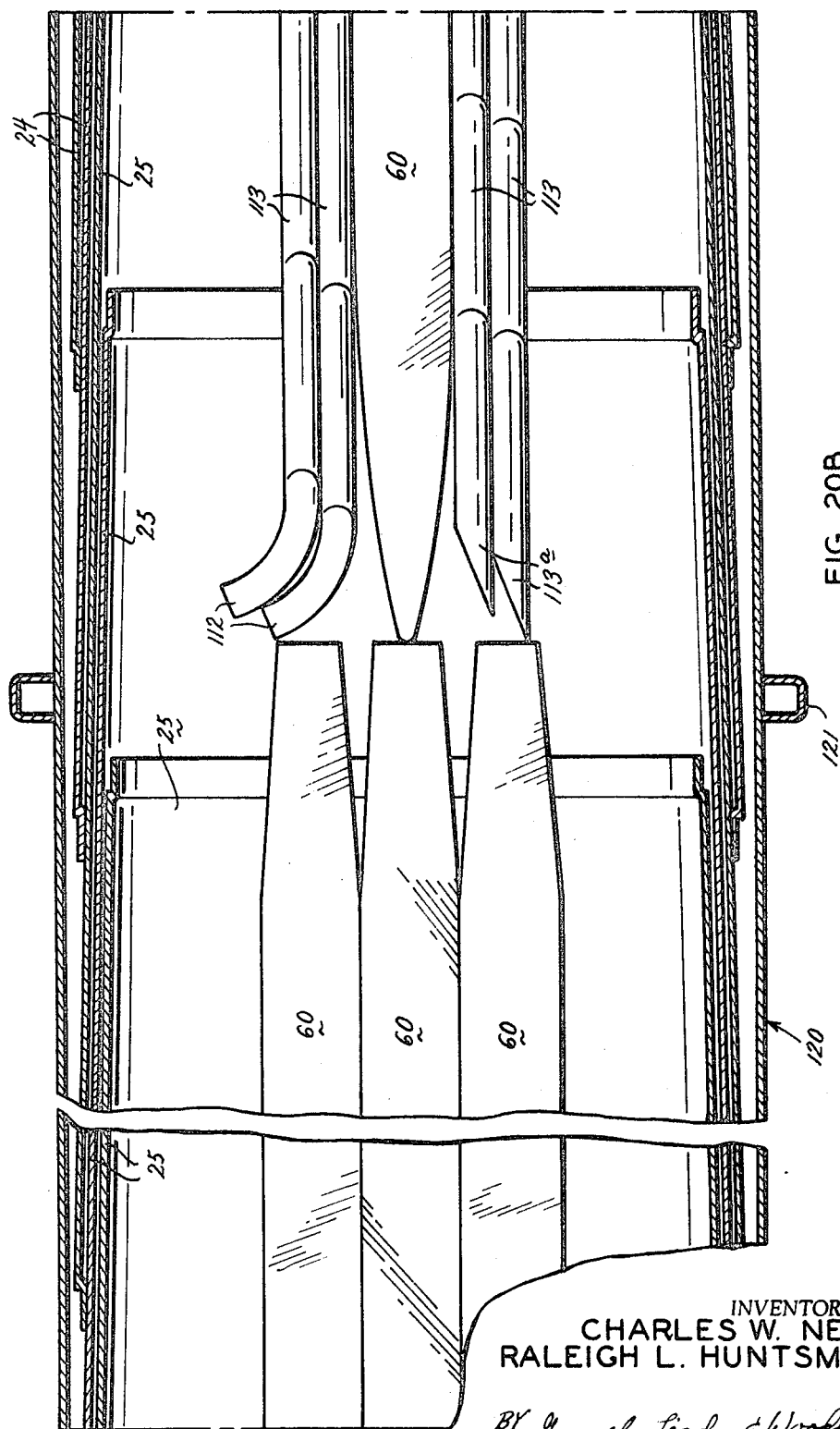
Figure 20D:
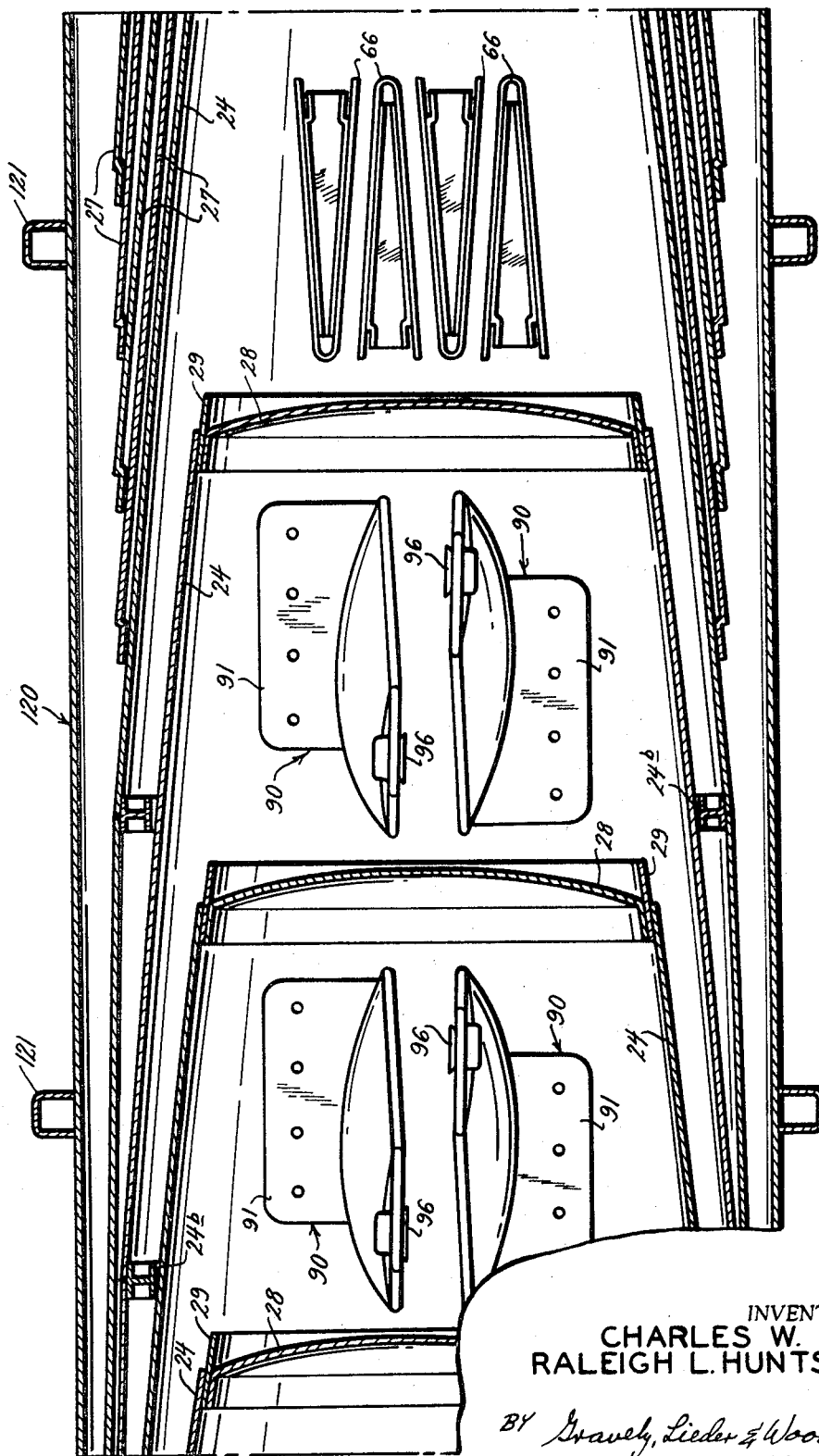

In FIG. 1 it can be seen that the fuel tank is made up of a forward main section 24, and aft main section 25, a nose cone 26 and an aft cone 27. The forward main section 24 includes two parts (FIG. 3) joined at a seam 24a and internally braced (FIG. 20D) by a ring 24b. As is shown in FIG. 2 and FIGS. 20D and 20E each main section 24 has its forward end closed off by a bulkhead 28 having its rim sealed to a flange ring 29 which projects outwardly to provide a seat for the nose cone 26. As indicated in FIG. 2 the nose cone 26 is held by a plurality of threaded elements 30 so that the cone 26 can be quickly detached.

The main forward and aft sections 24 and 25 are connected (FIG. 6A) by a splice assembly 31, and the aft main section 25 and aft cone 27 are connected (FIG. 6B) by a similar splice assembly 32. The assembly 31 includes an external ring 33 having inwardly directed ribs which mate with outwardly directed ribs on each of a pair of flanges 34 and 35 to be joined. Flange 34 is secured to the rear end of the forward main section 24 and flange 35 is secured to the forward end of the aft main section 25. As seen in FIG. 1, the ring 33 has mating flanges at the abutting ends to form a releasible connection 36. The aft main section 25 and aft cone 27 are connected (FIGS. 4, 5 and 6B) by a splice assembly 32 which includes an external ring 37 having inwardly directed ribs which mate with outwardly directed ribs on each of a pair of flanges 38 and 39 to be joined. The ribs are mated to provide a leak-proof seal and the ring 37 is held in position by the attachment of end flanges which form a releasible connection 40.

The splice 32 supports an internal bulkhead member 41 which divides the tank into two main compartments, the first compartment is defined between the forward bulkhead 28 and bulkhead 41, and the second compartment is aft of bulkhead 41 in the aft cone section 27. In addition to the bulkheads 28 and 41, the tank section 24 is braced (FIG. 6A) by an internal circular split rib 42 that can be expanded circumferentially into locked position between prepositioned cleats 43 secured at spaced intervals about the inner surface of tank section 24. The The expansion and contraction of rib 42 will be explained presently. Next, the splice 31 is supported by a ring 44 (FIG. 6A) that has an annular fin 45 which fits between the flanges 34 and 35. Aft of the ring 44 there is provided a forward pylon support rib 46 that is split so it can be sufficiently collapsed to slip over the pre-positioned cleats 47, after which the rib is expanded. Aftwardly of rib 46 is an aft pylon support rib 48 (FIG. 6B) which is like rib 46 and is positioned by cleats 49. The bulkhead 41 is aft of rib 48 and is supported by a ring 50 which is formed with the fin 51 that fits between flanges 38 and 29 (FIG. 4). The next support is the aft restraint support ring 52 which is held in position (FIGS. 1, 6B and 11) by threaded elements 53. The ring 52 supports the inner portions of the aft restraint post 54. There is a collar 55 at the top side of the aft cone 27 which defines a suitable opening for the projection of the exterior part 56 of the post 54.

Referring to FIGS. 6B, 7 and 8, it is seen that the rib 48 has split ends with transverse webs 48a and 48b. The webs support a jack screw element 57 having a nut 58 that presses against web 48b while the shoulder on the jack screw element 57 pushes on web 48a. This means is used to expand the rib 48 into position, and permits it to be collapsed for removal. The rib 46 is similarly equipped and it is not believed necessary to show or describe the same.

In FIG. 1 there is shown a pylon structure 60 by which a fuel tank is attached to the wing or other part of an aircraft. The structural components of the pylon are shown in FIGS. 6A, 6B, 7, 9, 10, 13, 14, 15 and 17, and the following description will have reference to these views.

In FIGS. 6B and 7, the aft pylon support rib 48 receives a plurality of bolts 61 which engage in a main anchor member 62 of the pylon 60 to retain the pylon attached to the fuel tank. The main member 62 may be a casting or forging and is an assembly of parts to support a ball-headed connector 63 which fits into a socket 64 (FIG. 6B) in the wing or other part B of an aircraft. The aft portion of the pylon 60 is connected by elements 65 to the exterior part 56 of the restraint post 54 and the connection is enclosed in a fairing part 66. The upper end of the part 56 has a rearwardly opening slot 67 to receive the head end 68 of a pain 69 (FIG. 6B) carried in the aircraft.

Figure 14:
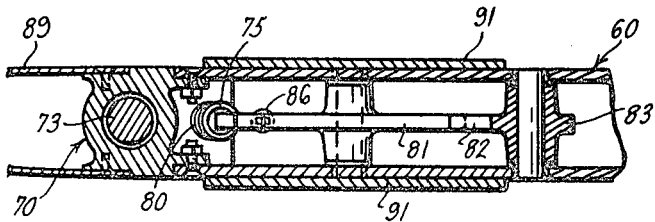
FIG. 14 is a fragmentary detail taken at line 14—14 in FIG. 6A.
Figure 15:
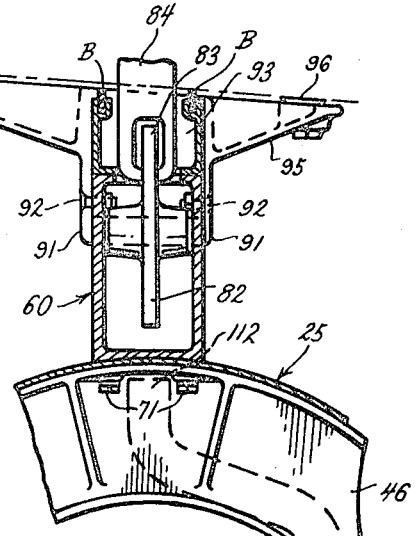
FIG. 15 is a transverse sectional detail taken at line 15—15 in FIG. 6A.
Figure 16:
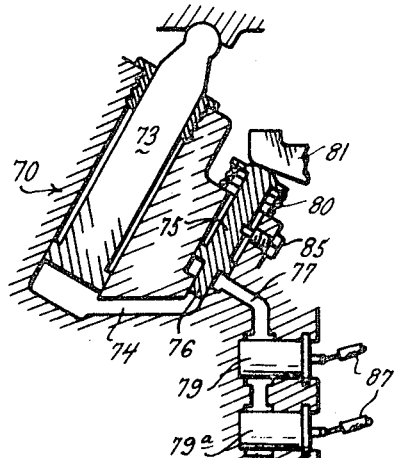
FIG. 16 is a schematic view of the jettison means and the explosive release system.

The forward end of the pylon 60 is best shown in FIGS. 6A, 14 and 15, and as shown includes a release or jettison fitting 70 which is secured to the forward support rib 46 in the tank by means 71, and to the pylon structure 60. This fitting 70 includes a cylinder for the jettison thrust piston 73 connected by passage 74 to a control valve plunger 75. The plunger 75 has (FIG. 16) an inner end 76 which normally closes passage 74 from communication with a passage 77 leading to an explosive chamber 78 where duplicate explosive charges 79 and 79A are housed. The plunger 75 is urged outwardly by a spring 80 against one end of a detent arm 81, the opposite end of the detent arm 81 (FIG. 6A) engages the arm 82 of a pivoted hook 83 which, in turn, engages an eye member 84 in the structure B. The plunger 75 is retained in the operating position by a shear pin 85 which holds the detent arm 81 cocked in the arm 82 of the hook 83 against the action of tension spring means 86. An electrical current is supplied by conductor 87 (FIGS. 6B and 16) from a connector plug 88 which is supplied with current from the aircraft body B in a well known manner. The jettison means 70 is enclosed by a suitable fairing 89 as shown in FIGS. 1 and 6A. Upon ignition of the explosive charges 79 and 79A the sudden pressure increase in passage 77 will cause the plunger 75 to move out, shearing the pin 85 and actuating detent arm 81 to release hook 83. At the same time the pressure will increase in passage 74 and force the thrust piston 73 outwardly to push against the structure B. This action (FIGS. 6A and 6B) results in the tank being bodily pushed away to unsnap the ball-head 63 so that the nose cone 26 falls away and allows the aft end of the tank to disengage by having the slot 67 pull away from the head 68 of pin 69.

Figures 17, 18:
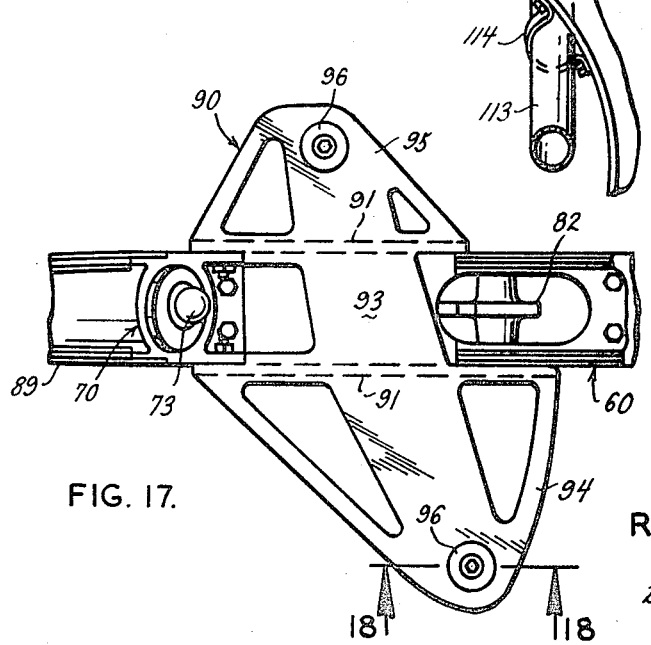
FIG. 17 is a fragmentary plan view of the pylon swaybrace as seen at line 17—17 in FIG. 6A.

In FIGS. 1, 15, 17 and 18 there is seen the swaybrace means 90 for the pylon 60. The swaybrace 90 is either right or left hand, depending upon the position required. In general it includes a pair of side plates 91 attached by means 92 to the pylon 60 (FIGS. 14 and 15). The side plates 91 are integral with the cross member 93 (FIGS. 6A and 17), and the member 93 is integral with the lateral wings 94 and 95 which engage the adjacent surfaces of the structure B. It is seen in FIG. 18 that the wing 94 is provided with an adjustable pad 96 held in the seat element 97 by the threaded plug 98. A similar pad 96 is mounted in like manner in the wing 95.

With the fuel tank properly assembled it can be seen in FIGS. 6A and 6B, and to some extent in FIGS. 7, 12 and 15, that the transfer of fuel between the tank and the aircraft takes place in conduit 100 which has a ball shaped end 101 mounted in a pull-away sealed fitting 102 which includes the base 103 having a seal ring 104 engaged on the end 101 and held by a cap 105. The inner end 106 of the base 103 is engaged in the open end 107 of the conduit 108 and the sliding fit is sealed by the seal ring 109. The lower end of conduit 108 is connected to a valve 110 located adjacent the bottom of the aft main section 25 of the fuel tank. When the forward main section 24 and the aft main section 25 are filled with fuel the fuel level reaches the inlet end 112 (FIGS. 6A and 15) of a cross-over filling tube 113 which is held in place by suitable brackets 114. The lower end 114 of the tube 113 passes through bulkhead 41 and opens adjacent the lower forward portion of the aft cone section 27. The valve 110 is controlled by a level sensor device 115 through a control conduit 116. Air equilization is obtained through the air conduit 117 having its inner end in the aft cone section 27 since air in the tank sections ahead of the bulkhead 41 is taken care of by the crossover conduit 113, as is well understood.

It is observed now that service access to the interior of the tank sections can be easily had by removing one or both of the splice assemblies 31 and 32, and there is no weakening of the structure involved. It is also observed that the internal parts of the fuel tank structure is removably installed in such a manner that the tank sections 24, 25, 26 and 27 can be cleared for nested packaging as is shown in FIGS. 20A through 20E. Also it is shown in FIG. 21 that the expandable ribs 48 (FIG. 8) can be partly coiled to allow the same to be fitted into the end of the packaging container or tube 120 shown in FIG. 19 in condition for storage or shipping. The tube 20 is braced in a number of places by rings 121, and the loaded tube can be hoisted by sling rings 122 having hook engaging ears 123. The rings 122 at each end of the tube 120 retain closure discs 124 (FIGS. 20A and 20E) over the ends. Thus, four complete fuel tanks, with all necessary internal and external components, can be placed inside a single tube 120, thereby providing a considerable condensation of the tanks.

There has been shown and described a preferred form of fuel tank and of means for packaging a plurality of fuel tanks in a single container. The fuel tank itself has novel structure provisions for high performance with gravity and in-flight refueling capability, as well as provision for power ejection thereof from an aircraft. The advantages of the subject invention are greater nesting ratio for logistics improvement, less manufacturing labor and material, less chance of leaks, considerably more accessibility to internal components, better balance for freedom from flutter, fewer parts which reduces inventory, and great improvement in the speed increase and load factor capabilities. It is a distinct improvement to embody the concept of a conic frustrum for the main sections of the fuel tank since this shape has greater ability to nest compactly and can be produced with less man-hours and at less cost. The absence of the usual access doors or cover-plates is unique, this being replaced by the entirely new concept of sectionalizing the fuel tank and using a knock-down assembly principle. In the usual types of fuel tanks with access doors, hatches and the like, there is possible access to only about ten percent of the internal components, but in a knockdown sectionalized fuel tank of this improvement at least half or fifty percent of the components can be made accessible.

It can be appreciated that the structure of the tank can be used to house material other than fuel by removing the fuel handling means 108, 110, 113, 115 and 116, for example, so that the interior will be free to receive whatever load is desired. Electronic equipment can be installed in the tank for use by the personnel of the aircraft, material to be air dropped can be housed therein, and many other uses can be made of the same.

This invention is intended to cover all changes and modifications of the examples of the invention herein chosen for purposes of the disclosure.

What is claimed is:

1. In a cargo carrier assembly the combination including: at least two cargo carrying sections having adjacent circular open ends; means connecting said adjacent open ends in alignment comprising flange elements carried by each open end forming an outwardly open recess encircling the open end, each flange element being positioned radially inwardly of the open end to present an outwardly opening circumferential recess, a split clamping ring encircling said flange elements and simultaneously engaged in each of said circumferential recesses to be flushed with the exterior of the assembly, detachably joining the ends of said split in the clamping ring to retain said ring in said circumferential recesses; at least one support rib removably positionable internally of said sections, each rib being circular and having a split to form adjacent ends, and means at said split to expand and contract the circumferential dimension of said rib; and rib locator means disposed internally of said sections, said ribs being contractable sufficiently to pass within said flange elements and said locator means.

2. The combination set forth in claim 1 in which one of said cargo carrying sections has a second open end remote from its said circular open end, and closure means mounted in said second open end, said closure means including an axially extending flange mounted in said circular opening with an exposed end, a bulk head wall having a circular flange positionable within and carried by said flange axially inwardly of its exposed end, and a nose cover removably connected to said exposed flange end.

References Cited

UNITED STATES PATENTS

| 2,471,296 | 5/1949 | Allen | 220—5 |
| 2,648,454 | 8/1953 | Dean | 220—5 |
| 2,653,541 | 9/1953 | Kanode | 220—5 X |
| 2,661,115 | 12/1953 | Fletcher | 220—5 |
| 2,700,458 | 1/1955 | Brown | 220—5 X |
| 2,781,935 | 2/1957 | Spieth | 220—80 X |
| 2,832,503 | 4/1958 | Baumann | 220—80 |

GEORGE E. LOWRANCE, Primary Examiner

U.S. Cl. X.R.

220—80